July 29, 1969   J. F. J. KRUGERS   3,458,258
METHOD OF DETECTING A CARBON IN THE GASEOUS PHASE
Filed Feb. 5, 1965
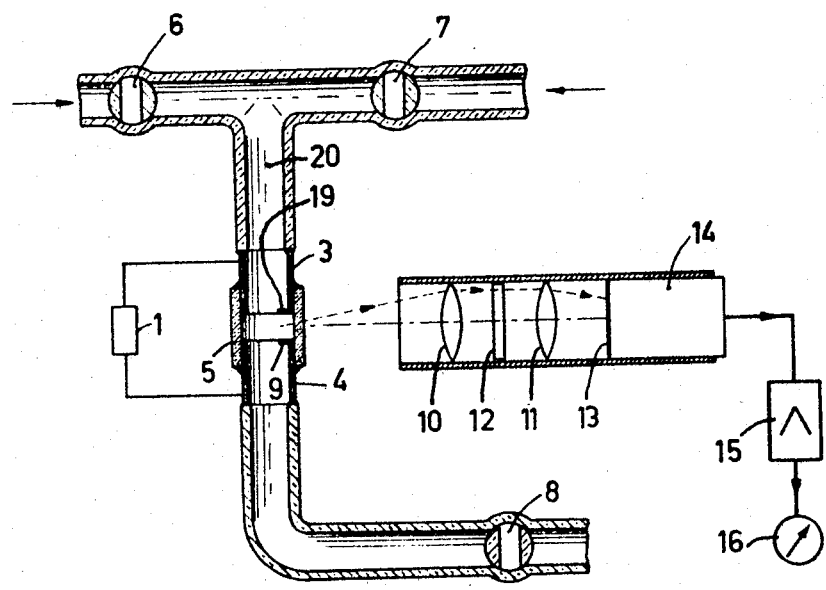
INVENTOR.
JOHAN F.J. KRUGERS
BY
*Frank R. Trifari*
AGENT 3,458,258
METHOD OF DETECTING A CARBON IN THE GASEOUS PHASE
Johan Felix Jozef Krugers, Amsterdam, Netherlands, assignor, by mesne assignments, to U.S. Philips Corporation, New York, N.Y., a corporation of Delaware
Filed Feb. 5, 1965, Ser. No. 430,523
Claims priority, application Netherlands, Mar. 26, 1964, 6403239
Int. Cl. G01j 3/00; G01n 1/00
U.S. Cl. 356—36     1 Claim

ABSTRACT OF THE DISCLOSURE

The invention is a method for spectrographically detecting the presence of gaseous carbon. Substantially pure nitrogen is accumulated in an ionization chamber, ionized and mixed with the carbon-containing gas forming the CN radical which is easily detected by spectrographic analysis.

---

The invention relates to a method of detecting a substance in the gaseous phase, which is contained in a space closed from the open air. An electric discharge is produced in the space and the resultant radiation is analysed.

Such a method is known. The electric discharge is produced in the known method in a substantially exhausted vessel between two electrodes connected to a voltage source. With a given potential developed across the space between the electrodes the collisions between charge carriers and the atoms of the gaseous substance bring one or more of the electrons of the outer shell of the atoms into the excited state. While irradiating an energy quantum the atoms return to their initial state. The wavelength of the resultant radiation is characteristic of the substance concerned. The wavelength is measured by decomposing the radiation with the aid of a dispersing agent, for example a prism into the various components, which are subsequently projected onto a radiation-sensitive element, for example a photographic layer (sheet or film) or onto the photo-cathode of a photo-multiplicator tube and by comparing the position of the blackening on the tube with the positions of known radiation.

The intensity of the radiation is measured by comparing the degree of blackening of the photographic layer or the output signal of the photomultiplicator tube respectively with the degree of blackening and the output signals produced by a radiation of known intensity.

The substance to be examined is often applied in the form of a powdery salt to one of the electrodes and evaporated by heat. The discharge takes place in atmospheric pressure.

The substance to be examined may also be contained in a gas mixture which is conducted between the electrodes. The electric discharges are then performed in a space which is at a low gas pressure, usually of a few millimetres Hg.

It has been found that great sensitivity can be attained either not at all or only with great difficulty by the known methods.

The invention has for its object to provide a method of the kind set forth by simple means, which is extremely sensitive and responds rapidly to variations in the composition of the gas. It is characterized in that the substance to be detected is mixed with substantially oxygen-free, preferably pure, nitrogen, which is excited and activated. The term "activating" is to denote herein the formation of atomic nitrogen from nitrogen molecules and the term "excited" is to be understood to means the attainment of a higher energy level by molecular or atomic nitrogen. The excitation and the activation may be produced for example by spark discharge between two electrodes. If the substance to be detected is a carbon-containing compound, the reaction between the nitrogen and the carbon may take place outside the activation space.

It has been found by experiments that very small quantities of a carbon-containing compound can be detected by the method according to the invention. This is apparently due to the combination of certain properties of atomic nitrogen: atomic nitrogen has a comparatively long lifetime and reacts very violently. These properties may also be utilized to excite metal atoms forming an impurity and to detect them by the resultant emission of radiation.

Probably the following reactions may take place in the space between two electrodes: (1) the activated nitrogen atoms form with the carbon the radical CN (cyan); (2) the radical CN is or, subsequent to collision with a charge carrier, it becomes excited; (3) the cyan radical returns, while irradiating an energy quantum, to its stable state. These reactions also appear when the system consists of a carbon-containing gas with nitrogen as an impurity.

It has been found to be particularly advantageous to provide the electrodes between which the discharge is performed with an extension which is preferably made of a material differing from that of the associated electrode.

It should be noted that it is known per se that disturbances may be produced in a spectral picture by the occurrence of cyan bands, if the discharge vessel contains simultaneously nitrogen from the air and carbon.

By way of example the invention will now be described with reference to the drawing, which shows a device for carrying out the method according to the invention.

The space 20 is filled with pure nitrogen under a fairly high pressure, which is introduced through the cock 6. The space 20 comprises two coaxial, cylindrical, hollow electrodes 3 and 4, which are surrounded by a hollow quartz cylinder 5. Between the electrodes 3 and 4 there is applied a high alternating voltage obtained from a voltage source 1.

An electric discharge is maintained in the nitrogen atmosphere between the electrodes 3 and 4. The gaseous carbon compound to be examined, if desired in a high degree of dilution with the pure nitrogen, is allowed through the cock 7 to enter the space 20 and may be exhausted through a cock 8. This gas reacts with the atomic nitrogen in the manner described above and radiation is emitted in the visible and in the ultraviolet regions. The measurement is carried out in a narrow band of wavelengths around a central wavelength of 3880 A. Through the lens system 10, 11 and the filter 12, which allows only a radiation in the range around 3880 A. to pass, the emitted light is projected onto the light-sensitive cathode of the photomultiplicator tube 14. The output signal of the tube 14 is amplified by the amplifier 15. The amplified signal is read from the instrument 16.

The electrodes 4 and 3 are provided with projecting parts 9 and 19 respectively. The discharge between the electrodes is thus concentrated between the extensions 9 and 19. In the first place the discharge is now stable and secondly the lens system 10, 11 can be adjusted to the same place of the discharge space.

The method according to the invention may be carried out under a fairly high nitrogen pressure, for example of the order of 1 atmosphere. This has the following advantages: (1) the discharge space may be comparatively small; (2) the discharge is obtained at a fairly low current of the order of a few tens of milliamperes. Therefore the discharge does not take place in the region of arcing, so that the electrodes are not heated or hardly heated by incident ions. There is consequently no risk of evaporation of said electrodes. This excludes disturbing reactions in the discharge space. Therefore, the choice of electrode material is not much restricted.

In one embodiment the space 20 was filled with pure nitrogen of 1 atmosphere. The voltage source 1 had a terminal voltage of 15 kv. The current between the electrodes 3 and 4 amounted to 40 ma. The electrodes 3 and 4 were made of silver and the extensions 9 and 19 of copper. The addition of $5 \times 10^{-12}$ gm. of carbon per second in the form of the carbon compound $C_3H_8$ to the nitrogen resulted in a deflection just sufficient to exceed the noise level of the discharge.

What is claimed is:

1. A method of detecting a carbon containing substance comprising the steps of accumulating substantially pure elemental nitrogen in a given space region at a pressure of about one atmosphere, generating an electric discharge in the accumulated nitrogen thereby to excite and activate the said nitrogen, introducing the said carbon containing substance in a gaseous state into the excited and activated nitrogen within the electrical discharge thereby to react carbon of said substance and the said excited and activated nitrogen to form CN radicals in the reaction space, and spectrographically detecting said CN radical within the area of the electrical discharge.

References Cited

UNITED STATES PATENTS 3,032,654   5/1962   Fay et al.

OTHER REFERENCES

Spectrographic Determination of Nitrogen in Some Organic Nitrogen Compounds, L. D. Frederickson, Jr., and L. Smith, Analytical Chemistry, vol. 23, issue 5, pp. 742–744, May 15, 1951.

Emission Spectra from Mixtures of Atomic Nitrogen and Organic Substances, Kiess et al., 7th Symposium (International) on Combustion, London and Oxford, Aug. 28–Sept. 3, 1958, pp. 207–214.

RONALD L. WIBERT, Primary Examiner

V. P. McGRAW, Assistant Examiner

U.S. Cl. X.R.

23—232